United States Patent
Miyahara et al.

(10) Patent No.: US 8,612,141 B2
(45) Date of Patent: Dec. 17, 2013

(54) NAVIGATION SYSTEM FOR ESTIMATING AND DISPLAYING CANDIDATE DESTINATIONS

(75) Inventors: Tadashi Miyahara, Tokyo (JP); Toyoaki Kitano, Tokyo (JP); Hideto Miyazaki, Tokyo (JP); Tsutomu Matsubara, Tokyo (JP); Kuniyo Ieda, Tokyo (JP); Minoru Ozaki, Tokyo (JP); Syoji Tanaka, Tokyo (JP); Takashi Nakagawa, Tokyo (JP); Tomohiro Shiino, Tokyo (JP); Wataru Yamazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/497,147

(22) PCT Filed: Dec. 2, 2009

(86) PCT No.: PCT/JP2009/006542
§ 371 (c)(1),
(2), (4) Date: Mar. 20, 2012

(87) PCT Pub. No.: WO2011/067811
PCT Pub. Date: Jun. 9, 2011

(65) Prior Publication Data
US 2012/0179365 A1 Jul. 12, 2012

(51) Int. Cl.
*G01C 21/00* (2006.01)
(52) U.S. Cl.
USPC .......................................................... 701/428
(58) Field of Classification Search
USPC .......................................................... 701/428
See application file for complete search history.

(56) References Cited

U.S. PATENT DOCUMENTS

| | | | |
|---|---|---|---|
| 2007/0005235 A1* | 1/2007 | Suzuki et al. | 701/200 |
| 2008/0177463 A1 | 7/2008 | Hamaguchi | |
| 2008/0319596 A1* | 12/2008 | Yamada | 701/22 |
| 2009/0030568 A1* | 1/2009 | Amano et al. | 701/22 |
| 2009/0157498 A1* | 6/2009 | Seltzer et al. | 705/14 |
| 2010/0057348 A1* | 3/2010 | Sekiyama et al. | 701/207 |

FOREIGN PATENT DOCUMENTS

| | | |
|---|---|---|
| JP | 4-24199 U | 2/1992 |
| JP | 2006-199273 A | 8/2006 |
| JP | 2007-085938 A | 4/2007 |
| JP | 2007-255996 A | 10/2007 |
| JP | 2007-322305 A | 12/2007 |
| JP | 2008-175773 A | 7/2008 |
| JP | 2008-249588 A | 10/2008 |
| JP | 2008-304243 A | 12/2008 |
| JP | 2009-8609 A | 1/2009 |
| JP | 2009-19936 A | 1/2009 |
| WO | 2008/146377 A1 | 4/2008 |

* cited by examiner

*Primary Examiner* — James Trammell
*Assistant Examiner* — Michael D Lang
(74) *Attorney, Agent, or Firm* — Birch, Stewart, Kolasch & Birch, LLP (57) ABSTRACT

A navigation system capable of enabling a user to use navigation functions such as route guidance without setting a destination. It includes an information recording unit for storing a driving history, a destination estimating unit for estimating a destination from the driving history stored in the information recording unit, a route computing unit for calculating a route to the destination estimated by the destination estimating unit, and an information display unit for causing the route calculated by the route computing unit to be displayed.

10 Claims, 9 Drawing Sheets

NAVIGATION SYSTEM FOR ESTIMATING AND DISPLAYING CANDIDATE DESTINATIONS

TECHNICAL FIELD

The present invention relates to a navigation system mounted in a vehicle for making various guidance, and particularly to a technique for simplifying its operation.

BACKGROUND ART

As a navigation system, Patent Document 1, for example, discloses a navigation system that automatically selects, even if a driver does not select, as to whether which route search methods are appropriate or not according to attribute information (driver profile) such as age of the driver and according to information about a route search method other drivers who share the attributes select frequently.

The navigation system transmits, when its navigation terminal sets route selection at "automatic" and executes a route search, a user profile and a route search method which is manually set previously simultaneously to a server in a telematics center. The server collects the profiles and route search methods manually set previously, which are transmitted from individual users, and decides as to whether which route search method is appropriate or not from the collected results and the user profile, and the navigation terminal carries out the route search in accordance with the decision result.

PRIOR ART DOCUMENT

Patent Document

Patent Document 1: Japanese Patent Laid-Open No. 2009-19936.

The navigation system disclosed in the foregoing Patent Document 1 has a problem in that since the user must carry out operation of setting a destination, first, the operation is troublesome. For example, as for a route such as a commuter route along which a user regularly drives everyday, since the user has a tendency not to use the navigation functions without setting the destination, development of a navigation system is desired which guides the user along the route even if the user neglects to set the destination.

The present invention is implemented to meet the foregoing demand. Therefore it is an object of the present invention to provide a navigation system capable of using the navigation functions such as route guidance without setting the destination.

DISCLOSURE OF THE INVENTION

A navigation system in accordance with the present invention includes: a position information acquiring unit for capturing the present position and a direction of travel; an information recording unit for storing a driving history; a destination estimating unit for estimating a plurality of destinations from the present position and the direction of travel and from the driving history stored in the information recording unit; a route computing unit for calculating routes to the plurality of destinations estimated by the destination estimating unit; and an information display unit for causing the route calculated by the route computing unit to be displayed.

According to the navigation system in accordance with the present invention, since it is configured in such a manner as to estimate the plurality of destinations from the driving history stored, and to calculate and cause to display the routes to the plurality of destinations estimated, it enables a user to use the navigation functions such as route guidance without the user operation of setting the destination.

EMBODIMENTS FOR CARRYING OUT THE INVENTION

The best mode for carrying out the invention will now be described with reference to the accompanying drawings.

Incidentally, the term "ecoroute" in accordance with the present invention refers not only to a route that can improve fuel efficiency and reduce time required (reduce $CO_2$), but also to a route that has, when the fuel remaining is low, a gasoline station along the way and can reduce the time required as much as possible, and a route that has, when a child rides together, a rest room along the way and can prevent an increase of the fuel consumption due to stopping and starting at the traffic lights at an intersection as much as possible, and these routes are represented as an "ecoroute" taking into account so-and-so.

Embodiment 1

Figure 1:
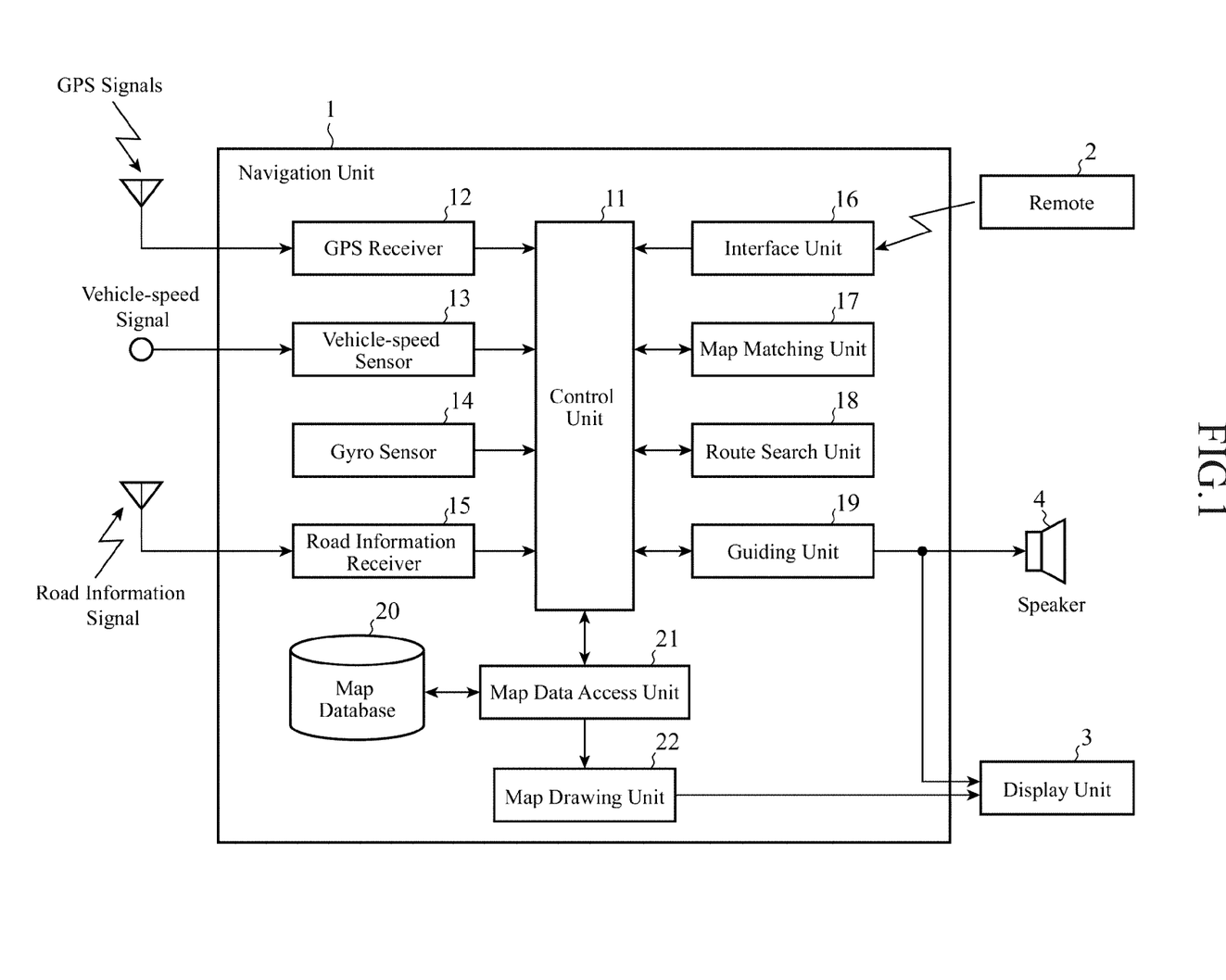
FIG. 1 is a block diagram showing a configuration of a navigation system of an embodiment 1 in accordance with the present invention.

FIG. 1 is a block diagram showing a configuration of the navigation system of the embodiment 1 in accordance with the present invention. The navigation system comprises a navigation unit 1, a remote control (abbreviated to "remote" from now on) 2, a display unit 3 and a speaker 4.

The navigation unit 1 controls the whole navigation system. Details of the navigation unit 1 will be described later.

The remote 2 is used for a user to give the navigation system various instructions such as causing the display unit 3 to scroll, inputting a destination or a spot along the route at a route search, or responding to a message prompting an operation, which is output from the display unit 3 or speaker 4. Incidentally, instead of the remote 2 or in combination with the remote 2, a touch screen can be provided for inputting various instructions by directly touching a touch sensor mounted on the screen of the display unit 3.

The display unit 3, which is composed of an LCD (Liquid Crystal Display), for example, displays a map, a vehicle position mark, a guide route and various other messages in response to a display signal delivered from the navigation unit 1. The speaker 4 outputs a guiding message in a voice in response to a voice signal delivered from the navigation unit 1 to give guidance in a voice.

Next, details of the navigation unit 1 will be described. The navigation unit 1 comprises a control unit 11, a GPS (Global Positioning System) receiver 12, a vehicle-speed sensor 13, a gyro sensor 14, a road information receiver 15, an interface unit 16, a map matching unit 17, a route search unit 18, a guiding unit 19, a map database 20, a map data access unit 21 and a map drawing unit 22.

The control unit 11, which is composed of a microcomputer, for example, controls the whole navigation unit 1. As for the foregoing interface unit 16, map matching unit 17, route search unit 18, guiding unit 19, map data access unit 21 and map drawing unit 22, they are implemented by application programs executed by the microcomputer. Details of the control unit 11 will be described later.

The GPS receiver 12 detects the present position of a vehicle (not shown), in which the navigation system is mounted, from GPS signals received from GPS satellites via an antenna. The present position data, which indicates the present position of the vehicle detected by the GPS receiver 12, is delivered to the control unit 11.

According to the vehicle-speed signal delivered from the vehicle, the vehicle-speed sensor 13 detects the travel speed of the vehicle. The speed data indicating the travel speed of the vehicle detected with the vehicle-speed sensor 13 is delivered to the control unit 11. The gyro sensor 14 detects the direction of travel of the vehicle. The direction data indicating the direction of travel of the vehicle, which is detected with the gyro sensor 14, is delivered to the control unit 11.

The road information receiver 15 receives a road information signal transmitted from the Vehicle Information and Communication System, for example. The road information signal received by the road information receiver 15 is delivered to the control unit 11 as road information. According to the road information, the control unit 11 creates a message indicating a traffic jam of a road, for example, and causes the display unit 3 to display on the screen and the speaker 4 to output it in a voice.

The interface unit 16 receives an instruction delivered from the remote 2 or generated through an operation of a control panel not shown and sends it to the control unit 11. In response to the instruction, the control unit 11 executes processing for carrying out scrolling of the screen, a facility search, route search or guidance, for example.

The map matching unit 17 locates the vehicle position indicated by the present position data delivered from the control unit 11 on the map which is a representation of the map data read from the map database 20 via the map data access unit 21 and control unit 11, and executes the processing of forming the vehicle position mark on the map. The processing result of the map matching unit 17 is delivered to the map drawing unit 22 via the control unit 11 and map data access unit 21.

The route search unit 18 searches for a route from the present position of the vehicle represented by the present position data delivered from control unit 11 to the destination indicated by the instruction delivered from the remote 2 or a control panel not shown via the interface unit 16 and control unit 11 or to a destination estimated by a destination estimating unit 36 within the control unit 11 (details of which will be described later) according to the map data acquired from the map database 20 via the map data access unit 21 and control unit 11. A route searched by the route search unit 18 is delivered to the guiding unit 19 via the control unit 11 and to the map drawing unit 22 via the control unit 11 and map data access unit 21.

The guiding unit 19 creates, from the map data read from the map database 20 via the map data access unit 21 and control unit 11, a guiding map and a guiding message for leading the vehicle when it travels along the route the route search unit 18 searches for, and delivers them to the display unit 3 and speaker 4, respectively. This causes the display unit 3 to display the guiding map and the speaker 4 to produce the guiding message in a voice.

The map database 20 stores various data relating to the map such as road data and facility data as the map data. The map data stored in the map database 20 is read by the map data access unit 21. The map data access unit 21 reads out the map data stored in the map database 20 in response to an instruction from the control unit 11 and delivers to the control unit 11 and map drawing unit 22.

According to the map data delivered from the map data access unit 21, the map drawing unit 22 creates drawing data for causing the display unit 3 to display the map and the like. The drawing data created by the map drawing unit 22 is delivered to the display unit 3 as the display signal. This causes the display unit 3 to display on its screen the map, vehicle position mark, guide route, and other various messages.

Figure 2:
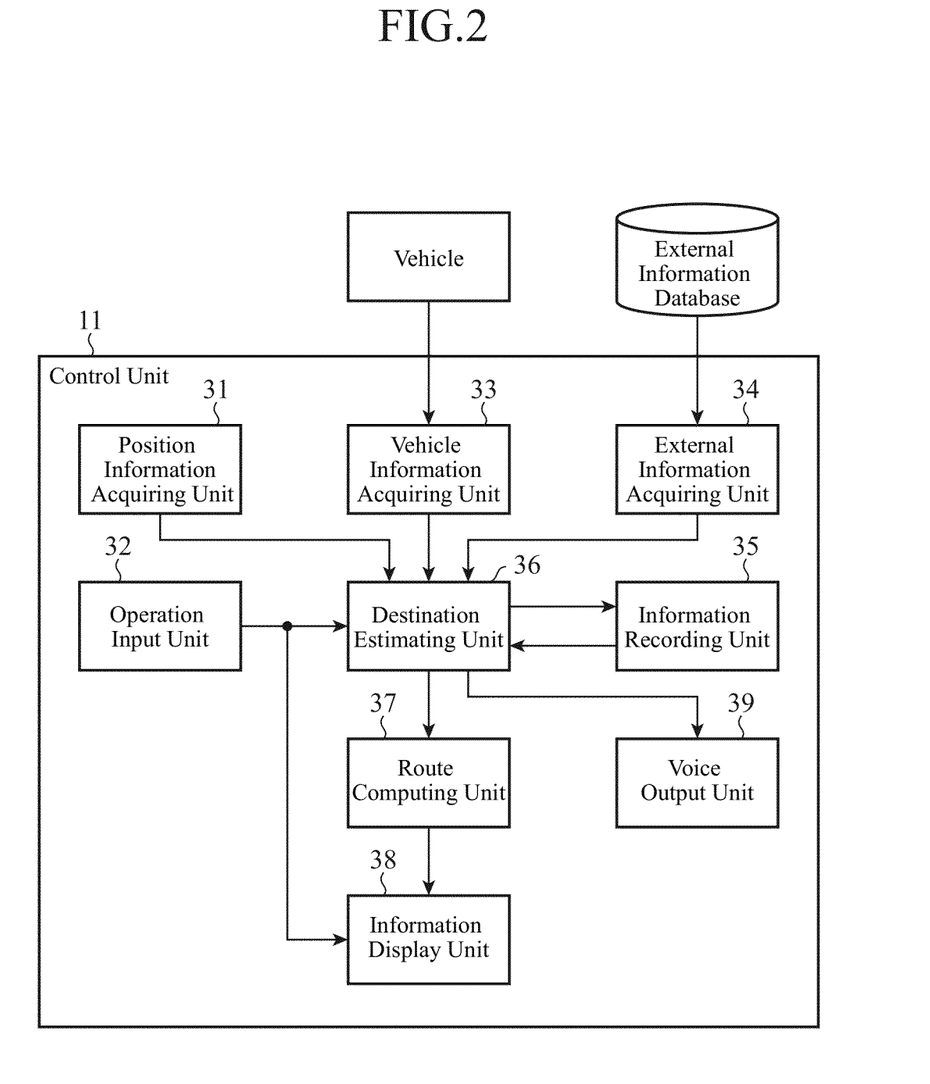
FIG. 2 is a block diagram showing a functional configuration of the control unit constituting the navigation system of the embodiment 1 in accordance with the present invention.

Next, details of the control unit 11 will be described. FIG. 2 is a block diagram showing a functional configuration of the control unit 11, which shows only a portion associated with the present invention. The control unit 11 comprises a position information acquiring unit 31, an operation input unit 32, a vehicle information acquiring unit 33, an external information acquiring unit 34, an information recording unit 35, a destination estimating unit 36, a route computing unit 37, an information display unit 38 and a voice output unit 39.

The position information acquiring unit 31 captures the present position data from the GPS receiver 12. In addition, the position information acquiring unit 31 receives the speed data from the vehicle-speed sensor 13 and the direction data from the gyro sensor 14, detects the present position of the vehicle using dead reckoning based on the speed data and direction data, and creates the present position data. This enables the navigation system to always detect the right present position of the vehicle because it can detect it by means of the dead reckoning even if the GPS receiver 12 cannot detect the present position of the vehicle because the vehicle enters a tunnel or a gap between high-rise buildings, for example. The present position data acquired or created by the position information acquiring unit 31 is delivered to the destination estimating unit 36.

Receiving the instruction delivered from the interface unit 16 in response to the operation of the remote 2, the operation input unit 32 sends it to the destination estimating unit 36 and information display unit 38.

The vehicle information acquiring unit 33 receives from the vehicle on which the navigation system is mounted the vehicle information such as fuel remaining (remaining battery life in the case of an electric vehicle), remaining battery life, the number of passengers, and average fuel efficiency, and transmits it to the destination estimating unit 36.

The external information acquiring unit 34 captures external information such as weather information, information on bargains, price information of gasoline stations and coupon information of restaurants from an external information database, and transmits it to the destination estimating unit 36.

The information recording unit 35 stores all sorts of information written by the destination estimating unit 36 such as driving history information, traffic jam information, vehicle information and road information. The information stored in the information recording unit 35 is read out by the destination estimating unit 36. Incidentally, as for the information stored in the information recording unit 35, it can be configured in such a manner that it is acquired from the outside by communication or from a recording medium such as a USB memory.

The destination estimating unit 36 estimates the destination of the vehicle from at least one of the present position data delivered from the position information acquiring unit 31, instruction delivered from the operation input unit 32, vehicle information delivered from the vehicle information acquiring unit 33, external information delivered from the external information acquiring unit 34 and all sorts of information read out of the information recording unit 35. The destination data indicating the destination estimated by the destination estimating unit 36 is delivered to the route computing unit 37 and a voice output unit 39.

The route computing unit 37 calculates a route to the destination indicated by the destination data delivered from the destination estimating unit 36. In this case, the route computing unit 37 can be configured in such a manner as to calculate the route using the destination estimated by the destination estimating unit 36 as the destination, or to calculate the route using the destination estimated as the direction of the destination. Alternatively, the route computing unit 37 can be configured in such a manner as to calculate an ecoroute that enables arriving at the destination cost-effectively by considering all factors involved such as fuel cost and an expressway toll, an express route that enables arriving at the destination in the shortest time, and a well-balanced route between the cost and period. Furthermore, the route computing unit 37 can be configured in such a manner as to calculate a route that will be able to achieve cost-effectiveness by taking into account various information such as by anticipating low-speed travel due to a traffic jam, fuel consumption due to stopping and starting at traffic signals, a volume of traffic depending on seasons or time, or locations of a traffic jam, or to calculate a route by taking into account opening hours of stores that provide all items of information. The route data representing the route calculated by the route computing unit 37 is delivered to the information display unit 38.

The term "balanced route" refers to a route that will enable reducing the express toll and fuel cost as compared with the express route with the fastest arrival time among a plurality of route candidates, and that will enable faster arrival as compared with a simple road route even though not as fast as the express route.

In addition, time and cost a person feels appropriate vary depending on users or distances covered such as difference in a sense for time and cost concerning driving of each person and difference in a sense for time and cost a person feels appropriate for short and long distances. Thus, a mechanism is added which can provide routes searched that will meet the sense of a user for the time and cost in a variety of cases by automatically learning various driving history information and route selection history information of each user.

The information display unit 38 creates the display data for displaying the route indicated by the route data delivered from the route computing unit 37, and sends to the map drawing unit 22 via the map data access unit 21. According to the display data delivered from the map data access unit 21, the map drawing unit 22 creates the drawing data for causing the display unit 3 to display a map including the route calculated by the route computing unit 37, and sends to the display unit 3 as the display signal. Thus, the display unit 3 displays on its screen the map including the route calculated by the route computing unit 37.

Incidentally, the information display unit 38 can be configured in such a manner that when receiving plural types of the route data such as an ecoroute, express route and balanced route from the route computing unit 37, it displays the plural types of the routes, and then displays one of the routes selected from the plural types of the routes in response to the instruction from the operation input unit 32.

The voice output unit 39 creates the voice data for outputting in a voice the destination indicated by the destination data delivered from the destination estimating unit 36, and sends to the guiding unit 19. The guiding unit 19 creates a guiding message indicating the destination from the voice data and sends to the speaker 4. Thus, the speaker 4 outputs the destination in a voice as a guiding message. As a result, the user can recognize the destination without watching the screen during driving.

Next, the operation of the navigation system of the embodiment 1 in accordance with the present invention with the foregoing configuration will be described. First, general operation of the navigation system will be described. When the navigation system is turned on, the present position data and map data are acquired. More specifically, the control unit 11 sends to the map matching unit 17 the present position data calculated from the present position data acquired from the GPS receiver 12 or calculated by the dead reckoning.

The map matching unit 17 reads out the map data from the map database 20 via the map data access unit 21 and control unit 11, and carries out matching processing of superimposing the vehicle position mark on the position corresponding to the present position data received from the control unit 11. The map data passing through the matching processing is delivered to the map drawing unit 22 via the control unit 11 and map data access unit 21. The map drawing unit 22 creates the drawing data from the map data delivered from the map matching unit 17, and sends to the display unit 3 as the display signal. Thus, the display unit 3 displays a map with the present position of the vehicle being placed at its center.

Figure 3:
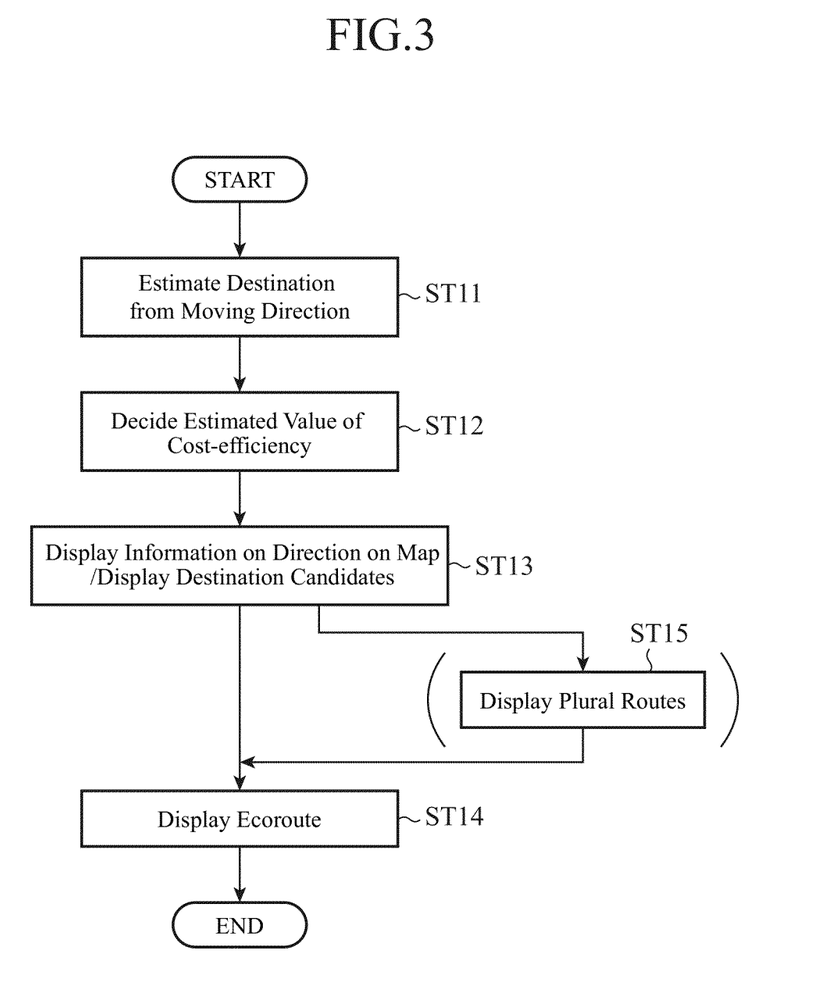
FIG. 3 is a flowchart showing the processing from a start of driving to a display of an ecoroute in the navigation system of the embodiment 1 in accordance with the present invention.

Next, the processing from a start of driving to the display of an ecoroute will be described with reference to the flowchart shown in FIG. 3. Incidentally, it is assumed here that the navigation system has as its operation mode an operation mode that estimates the destination without any operation of a user and an operation mode in which a user selects the destination by his or her operation.

Figure 4:
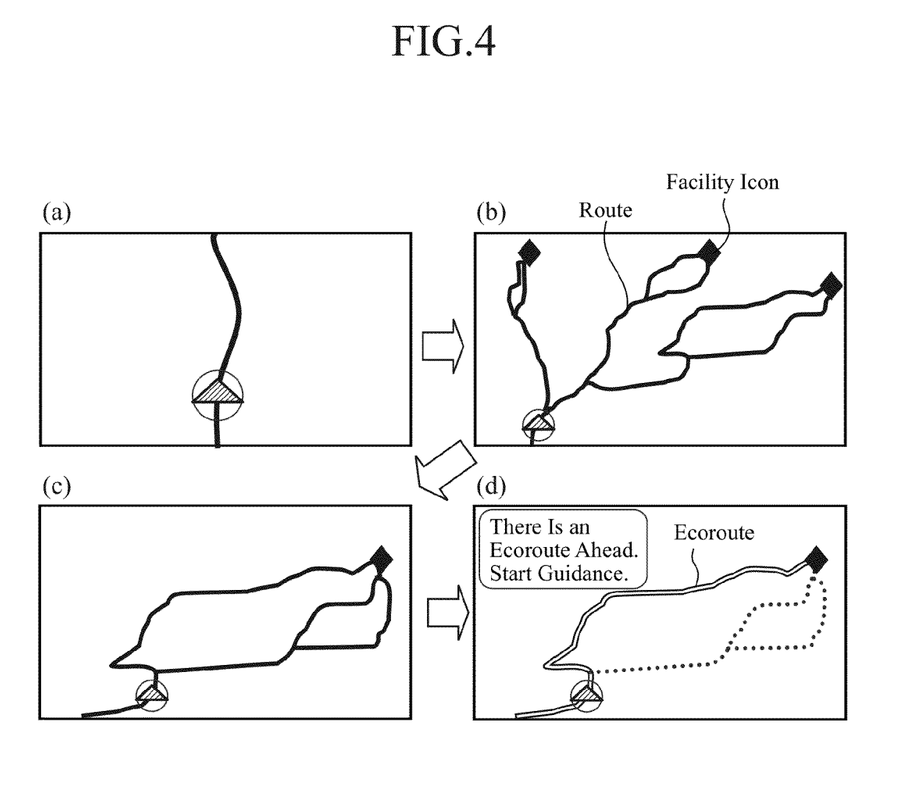
FIG. 4 shows an example of routes and facility icons displayed on the screen of the navigation system of the embodiment 1 in accordance with the present invention.

When driving is started, a road and the vehicle position on the road is displayed as shown in FIG. 4(a). When the vehicle with the navigation system mounted therein moves in this state, the destination is estimated from the direction of travel, first (step ST11). More specifically, when the vehicle with the navigation system mounted therein runs some distance, the estimation of the destination is made from varieties of information. To be concrete, the destination estimating unit 36 estimates the direction of travel from the transition state of the present position data delivered from the position information acquiring unit 31, and estimates the destination from the direction of travel estimated and the varieties of information (such as driving history, traffic jam information, vehicle information and road information) acquired from the information recording unit 35. A configuration is also possible that if a plurality of candidates of the destination are estimated at step ST11, the order of priority is given to the candidates and a prescribed number of the destination candidates with the higher order of priority is extracted from the destination candidates.

Next, an estimate of the cost-efficiency is calculated (step ST12). Here, the term "cost-efficiency" refers to a value that indicates as a whole whether the fuel efficiency is high or not considering the time period the vehicle arrives at the destination candidate estimated at step ST11, the presence or absence of ups and downs, and the presence or absence of traffic signals.

Next, display of the information about a direction of the destination and display of the destination candidates are made on the map (step ST13). FIG. 4(b) shows an example of a display of facility icons of destination candidates and routes up to the destination candidates when three destination candidates are estimated at step ST11. When the vehicle moves in this state, the destination candidates are narrowed down according to the vehicle position as shown in FIG. 4(c).

Here, in the operation mode that estimates the destination when a user does no operation, if a particular set condition is exceeded such as when the estimate of the cost-efficiency exceeds a prescribed threshold at the foregoing step ST12 or the distance is not less than a fixed value, an ecoroute display is carried out (step ST14). More specifically, the information display unit 38 gives an instruction to the map drawing unit 22 via the guiding unit 19 and map data access unit 21 to cause the display unit 3 to display the ecoroute and a message of starting ecoroute guidance as shown in FIG. 4(d). After that, the processing is terminated.

Incidentally, when the plural types of routes such as the ecoroute, express route and balanced route are calculated, a configuration is also possible which displays these plural types of routes (step ST15), and then displays the ecoroute when the ecoroute is selected from the plural types of routes in response to the instruction from the operation input unit 32.

Figure 5:
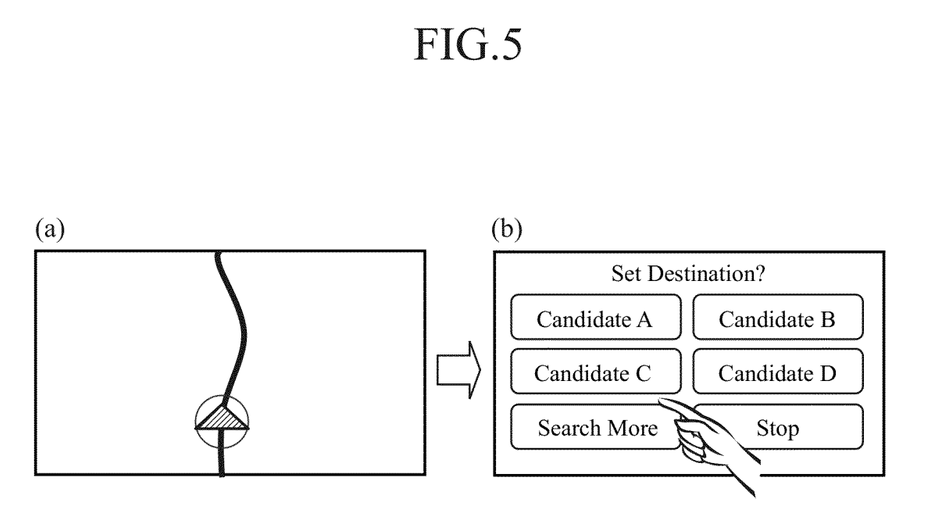
FIG. 5 is a diagram showing another example of a screen display in the navigation system of the embodiment 1 in accordance with the present invention.

In addition, when the operation mode is set which selects a destination in response to a user operation, a configuration is possible which prompts the user to select a destination by displaying a list of the destination candidates as shown in FIG. 5 at the time when driving a particular extent (prescribed distance).

Figure 6:
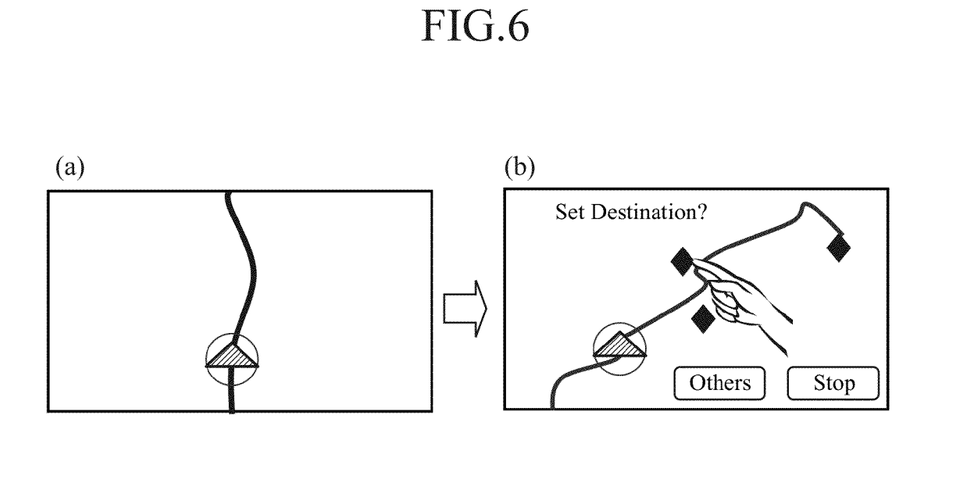
FIG. 6 is a diagram showing an example of a screen for setting a destination in the navigation system of the embodiment 1 in accordance with the present invention.

In addition, as shown in FIG. 6, a configuration is also possible which enables a user to set a destination by touching the facility icon of a destination candidate. The configuration can facilitate visually learning the direction it estimates, and enable intuitive operation. Besides, it can set not only facility icons, but also a spot along any desired road as a destination.

Figure 7:
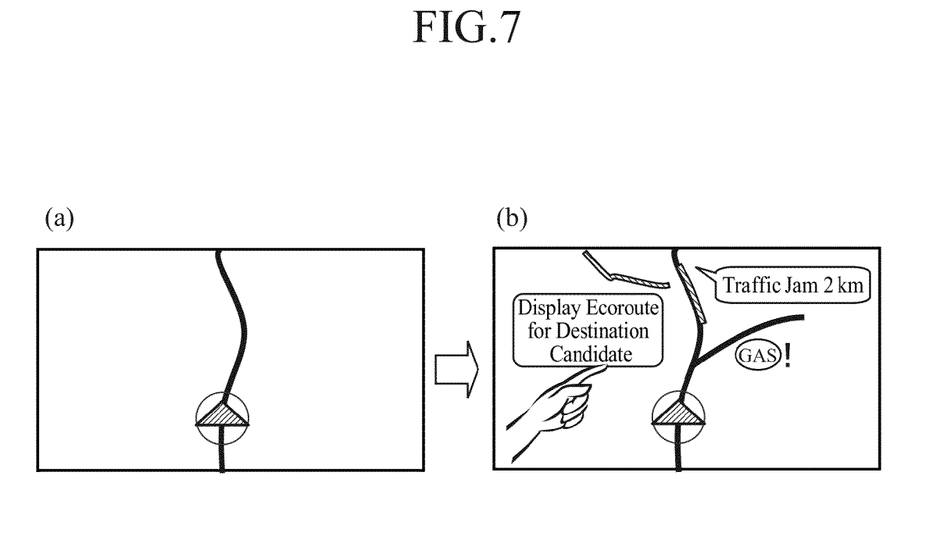
FIG. 7 is a diagram showing an example of a screen displaying information about the direction of the destination in the navigation system of the embodiment 1 in accordance with the present invention.

In addition, a configuration is also possible which displays the information about the direction of the destination as shown in FIG. 7 at a time when driving some extent. When guiding the ecoroute, it recommends to select the ecoroute by displaying information beneficial to the user such as traffic jam information concerning the destination estimated, the optimum gas or power service station with respect to the distance and price, and price information. In this case, it can decides the route considering the opening hours of a gasoline station, the lowest price station or full-empty information on electric power supply. Incidentally, as for a facility with an icon with "!", it shows that it has detailed information and that a user can view the detailed information by touching the icon. The configuration has an advantage of being able to improve the value of the navigation functions by increasing the frequency of utilizing them for users who do not use the navigation system.

Figure 8:
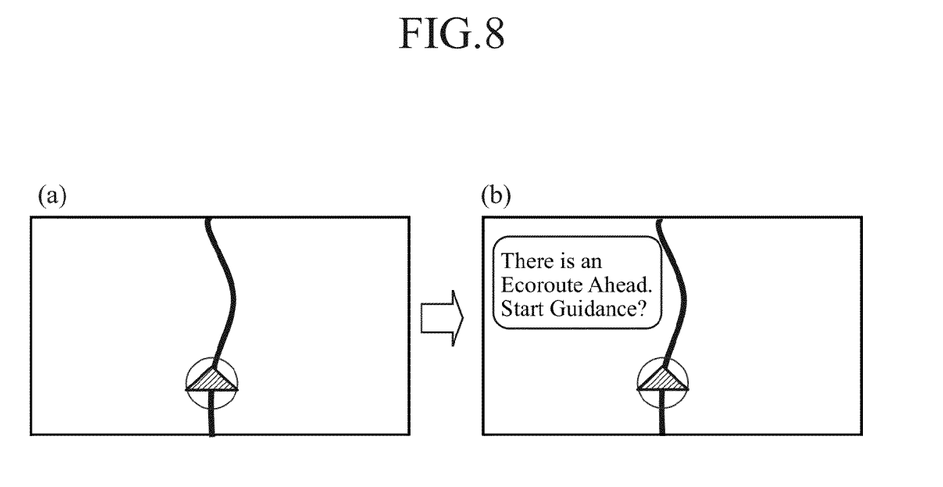
FIG. 8 is a diagram showing an example of a screen for informing of an ecoroute decided by taking into account the fuel-saving effect in the navigation system of the embodiment 1 in accordance with the present invention.
Figure 9:
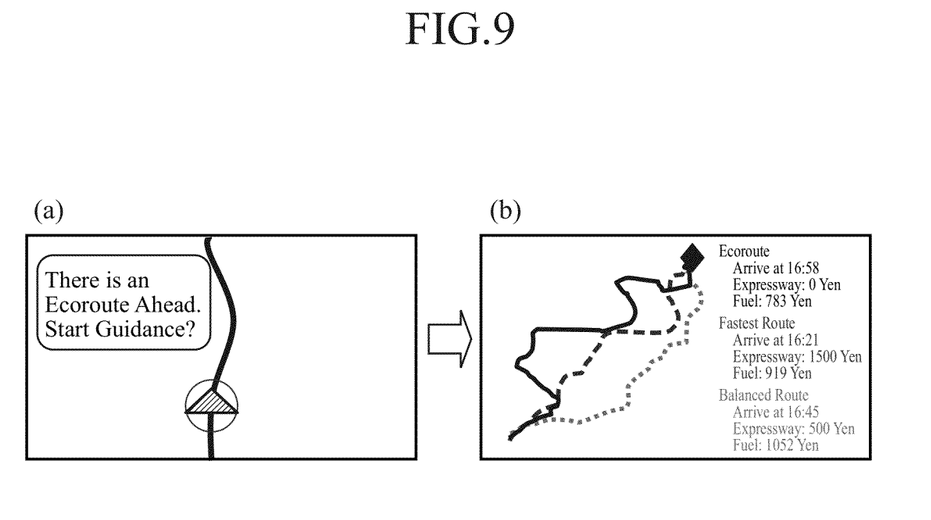
FIG. 9 is a diagram showing an example of a screen that displays a plurality of estimated routes to a destination to enable a user to select from them in the navigation system of the embodiment 1 in accordance with the present invention.

In addition, a configuration is also possible which can show an ecoroute decided by taking a fuel-saving effect into account as shown in FIG. 8. The configuration can recommend the best ecoroute even if the ecoroute varies depending on the time of passing. Furthermore, as shown in FIG. 9, a configuration is also possible which displays a plurality of routes to the destination estimated, that is, the ecoroute, express route and balanced route, and enables the user to select.

In addition, a configuration is also possible which presents an ecoroute by taking driver's skills into account. The configuration assumes that a person with low driving skills will impair the fuel efficiency along a mountain path and guides an ecoroute with smaller difference of elevation. Besides, a configuration is also possible which presents an ecoroute by taking account of a gross weight or vehicle characteristics. In addition, a configuration is possible which presents an ecoroute by taking passengers into account such as considering a toilet break when there is a child. Furthermore, a configuration is also possible which can set the destination estimated not only as the destination but also as a spot along the route.

INDUSTRIAL APPLICABILITY

The present invention can be applied to a navigation system or the like, which simplifies its operation and prompts a user to make better use of the navigation functions.

What is claimed is:

1. A navigation system comprising:
    a position information acquiring unit for capturing the present position and a direction of travel;
    an information recording unit for storing a driving history;
    a destination estimating unit for estimating a plurality of alternative candidate destinations from the present position and the direction of travel and from the driving history stored in the information recording unit;
    a route computing unit for calculating routes to the plurality of alternative candidate destinations estimated by the destination estimating unit; and
    an information display unit for causing the plurality of alternative candidate destinations estimated by the destination estimating unit and the routes to the plurality of alternative candidate destinations calculated by the route computing unit to be simultaneously displayed,
    wherein the destination estimating unit automatically narrows down the plurality of alternative candidate destinations as the position acquired by the position information acquiring unit changes, and the information display unit automatically narrows down the routes that are simultaneously displayed in accordance with the narrowing down of the plurality of alternative candidate destinations by the destination estimating unit.

2. The navigation system according to claim 1, wherein the route computing unit calculates the plurality of routes by using the plurality of destinations estimated by the destination estimating unit as the destination.

3. The navigation system according to claim 1, wherein the route computing unit calculates the plurality of routes by using the plurality of alternative candidate destinations estimated by the destination estimating unit as a direction of the destination.

4. The navigation system according to claim 1, further comprising:
    an operation input unit for a user to input an instruction by operation,
    wherein for at least one of the plurality of the routes, the route computing unit calculates an ecoroute that enables arrival at the destination cost-effectively, an express route that enables arrival at the destination in the shortest time, and a well-balanced route that has a balance between cost and time; and the information display unit selects, in response to the instruction input from the operation input unit, one of the ecoroute, express route and balanced route calculated by the route computing unit, and causes the route selected to be displayed.

5. The navigation system according to claim 4, further comprising:

an operation mode of automatically selecting one of the plurality of alternative candidate destinations as the destination, without receiving a user input indicating the destination, wherein when the operation mode is set, the information display unit starts route guidance of the ecoroute to the selected route when an estimate of the cost-efficiency exceeds a prescribed threshold.

6. The navigation system according to claim 4, wherein the information display unit displays, when guiding an ecoroute, an ecoroute decided by taking account of a gas or electric power service station.

7. The navigation system according to claim 1, further comprising:

an operation mode of selecting a destination, wherein in the operation mode, the information display unit prompts a user to select one of the plurality of alternative candidate destinations by displaying the plurality of alternative candidate destinations at a time when driving is done by a prescribed distance.

8. The navigation system according to claim 1, wherein the route computing unit calculates a route by anticipating fuel consumption due to low-speed driving because of a traffic jam or fuel consumption due to stop and start at a signal, or by anticipating a volume of traffic or a traffic jam location due to seasons or hours, and calculates an ecoroute by taking into account various information including opening hours of a store.

9. The navigation system according to claim 1, further comprising:

a speaker for making guidance in a voice in conjunction with guidance of the destination estimated by the destination estimating unit.

10. A method implemented in a navigation system, comprising:

capturing the present position and a direction of travel;

storing a driving history in an information recording device;

utilizing a microcontroller to estimate a plurality of alternative candidate destinations from the present position and the direction of travel and from the driving history stored in the information recording unit, and calculate routes to the plurality of alternative candidate destinations estimated by the destination estimating unit; and causing the plurality of alternative candidate destinations estimated by the destination estimating unit and the routes to the plurality of alternative candidate destinations calculated by the route computing unit to be simultaneously displayed on an information display device, wherein the destination estimating unit automatically narrows down the plurality of alternative candidate destinations as the position acquired by the position information acquiring unit changes, and the information display unit automatically narrows down the routes that are simultaneously displayed in accordance with the narrowing down of the plurality of alternative candidate destinations by the destination estimating unit.

* * * * *